(12) United States Patent
Banary, Jr.

(10) Patent No.: US 6,193,256 B1
(45) Date of Patent: Feb. 27, 2001

(54) GOLF EQUIPMENT TRAILER

(76) Inventor: James M. Banary, Jr., 14 Wamsley Pl. Box 84, Hurley, NY (US) 12443

( * ) Notice: Subject to any disclaimer, the term of this patent is extended or adjusted under 35 U.S.C. 154(b) by 0 days.

(21) Appl. No.: 09/353,958

(22) Filed: Jul. 15, 1999

(51) Int. Cl.[7] .............................. B62D 59/00; B62J 11/00; B62B 7/00
(52) U.S. Cl. ................... 280/400; 224/413; 280/DIG. 6; 280/656
(58) Field of Search ............................... 280/400, DIG. 6, 280/656; 296/77.1, 79; 224/401, 274, 413

(56) References Cited

U.S. PATENT DOCUMENTS

| | | | |
|---|---|---|---|
| 2,919,758 | * | 1/1960 | Newton et al. ...................... 224/274 |
| 4,119,331 | * | 10/1978 | Jackson ................... 280/656 |
| 5,207,361 | * | 5/1993 | Slifka ................................... 224/274 |
| 5,482,304 | * | 1/1996 | Smith ............................. 280/DIG. 6 |
| 6,120,053 | * | 9/2000 | DeAngelis ..................... 280/DIG. 6 |

* cited by examiner

*Primary Examiner*—Brian L. Johnson
*Assistant Examiner*—Matthew Luby

(57) ABSTRACT

A golf equipment trailer for hitching to a motorcycle to permit towing thereby of the trailer. The golf equipment trailer includes a carriage having a pair of ground engaging wheels and a forwardly extending elongate trailer tongue adapted for coupling to a trailer hitch. A pair of bag seats are mounted on the carriage between the wheels of the carriage. Each of the bag seats is adapted for resting a bottom of a golf bag thereon. A bag support frame is upwardly extended from the carriage. The bag support frame includes a back frame and a pair of side frames forwardly located from the back frame. The bag seats are positioned between the side frames and in front of the back frame.

18 Claims, 2 Drawing Sheets

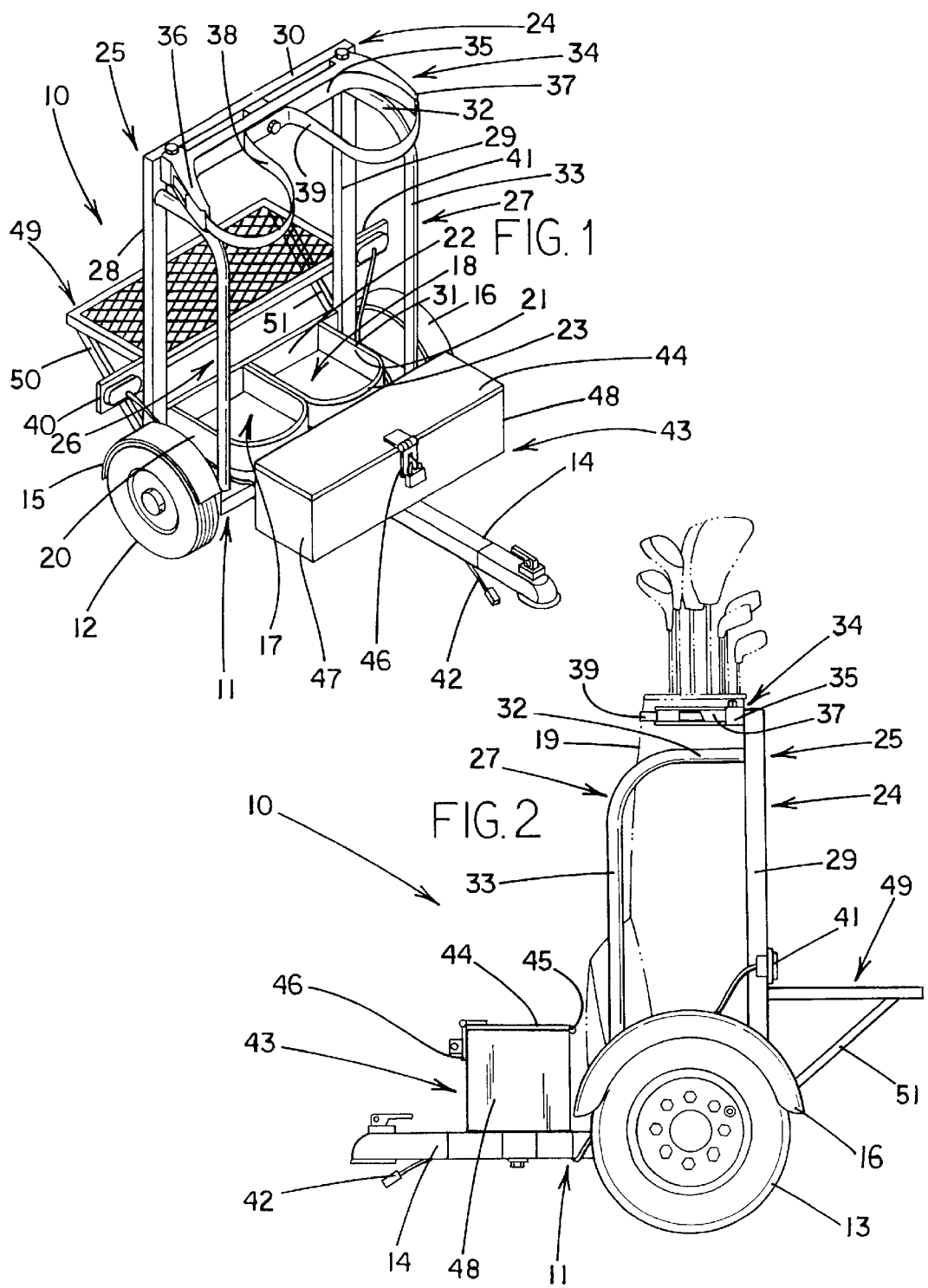

GOLF EQUIPMENT TRAILER

BACKGROUND OF THE INVENTION

1. Field of the Invention

The present invention relates to golf equipment trailers for motorcycles and more particularly pertains to a new golf equipment trailer for hitching to a motorcycle to permit towing thereby of the trailer.

2. Description of the Prior Art

The use of golf equipment trailers for motorcycles is known in the prior art. More specifically, golf equipment trailers for motorcycles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,057,283; 3,937,489; 4,536,001; U.S. Pat. No. Des. 373,100; U.S. Pat. Nos. 5,011,170; 4,659,100; and U.S. Pat. No. Des. 274,896.

While these devices fulfill their respective, particular objectives and requirements, the aforementioned patents do not disclose a new golf equipment trailer. The inventive device includes a carriage having a pair of ground engaging wheels and a forwardly extending elongate trailer tongue adapted for coupling to a trailer hitch. A pair of bag seats are mounted on the carriage between the wheels of the carriage. Each of the bag seats is adapted for resting a bottom of a golf bag thereon. A bag support frame is upwardly extended from the carriage. The bag support frame includes a back frame and a pair of side frames forwardly located from the back frame. The bag seats are positioned between the side frames and in front of the back frame.

In these respects, the golf equipment trailer according to the present invention substantially departs from the conventional concepts and designs of the prior art, and in so doing provides an apparatus primarily developed for the purpose of hitching to a motorcycle to permit towing thereby of the trailer.

SUMMARY OF THE INVENTION

In view of the foregoing disadvantages inherent in the known types of golf equipment trailers for motorcycles now present in the prior art, the present invention provides a new golf equipment trailer construction wherein the same can be utilized for hitching to a motorcycle to permit towing thereby of the trailer.

The general purpose of the present invention, which will be described subsequently in greater detail, is to provide a new golf equipment trailer apparatus and method which has many of the advantages of the golf equipment trailers for motorcycles mentioned heretofore and many novel features that result in a new golf equipment trailer which is not anticipated, rendered obvious, suggested, or even implied by any of the prior art golf equipment trailers for motorcycles, either alone or in any combination thereof.

To attain this, the present invention generally comprises a carriage having a pair of ground engaging wheels and a forwardly extending elongate trailer tongue adapted for coupling to a trailer hitch. A pair of bag seats are mounted on the carriage between the wheels of the carriage. Each of the bag seats is adapted for resting a bottom of a golf bag thereon. A bag support frame is upwardly extended from the carriage. The bag support frame includes a back frame and a pair of side frames forwardly located from the back frame. The bag seats are positioned between the side frames and in front of the back frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new golf equipment trailer apparatus and method which has many of the advantages of the golf equipment trailers for motorcycles mentioned heretofore and many novel features that result in a new golf equipment trailer which is not anticipated, rendered obvious, suggested, or even implied by any of the prior art golf equipment trailers for motorcycles, either alone or in any combination thereof.

It is another object of the present invention to provide a new golf equipment trailer which may be easily and efficiently manufactured and marketed.

It is a further object of the present invention to provide a new golf equipment trailer which is of a durable and reliable construction.

An even further object of the present invention is to provide a new golf equipment trailer which is susceptible of a low cost of manufacture with regard to both materials and labor, and which accordingly is then susceptible of low prices of sale to the consuming public, thereby making such golf equipment trailer economically available to the buying public.

Still yet another object of the present invention is to provide a new golf equipment trailer which provides in the apparatuses and methods of the prior art some of the advantages thereof, while simultaneously overcoming some of the disadvantages normally associated therewith.

Still another object of the present invention is to provide a new golf equipment trailer for hitching to a motorcycle to permit towing thereby of the trailer.

Yet another object of the present invention is to provide a new golf equipment trailer which includes a carriage having a pair of ground engaging wheels and a forwardly extending elongate trailer tongue adapted for coupling to a trailer hitch. A pair of bag seats are mounted on the carriage between the wheels of the carriage. Each of the bag seats is adapted for resting a bottom of a golf bag thereon. A bag support frame is upwardly extended from the carriage. The bag support frame includes a back frame and a pair of side frames forwardly located from the back frame. The bag seats are positioned between the side frames and in front of the back frame.

Still yet another object of the present invention is to provide a new golf equipment trailer that lets motorcycle enthusiasts travel to golf courses on their motorcycles with their golf equipment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new golf equipment trailer according to the present invention.

FIG. 2 is a schematic side view of the present invention.

DESCRIPTION OF THE PREFERRED EMBODIMENT

Figure 3:
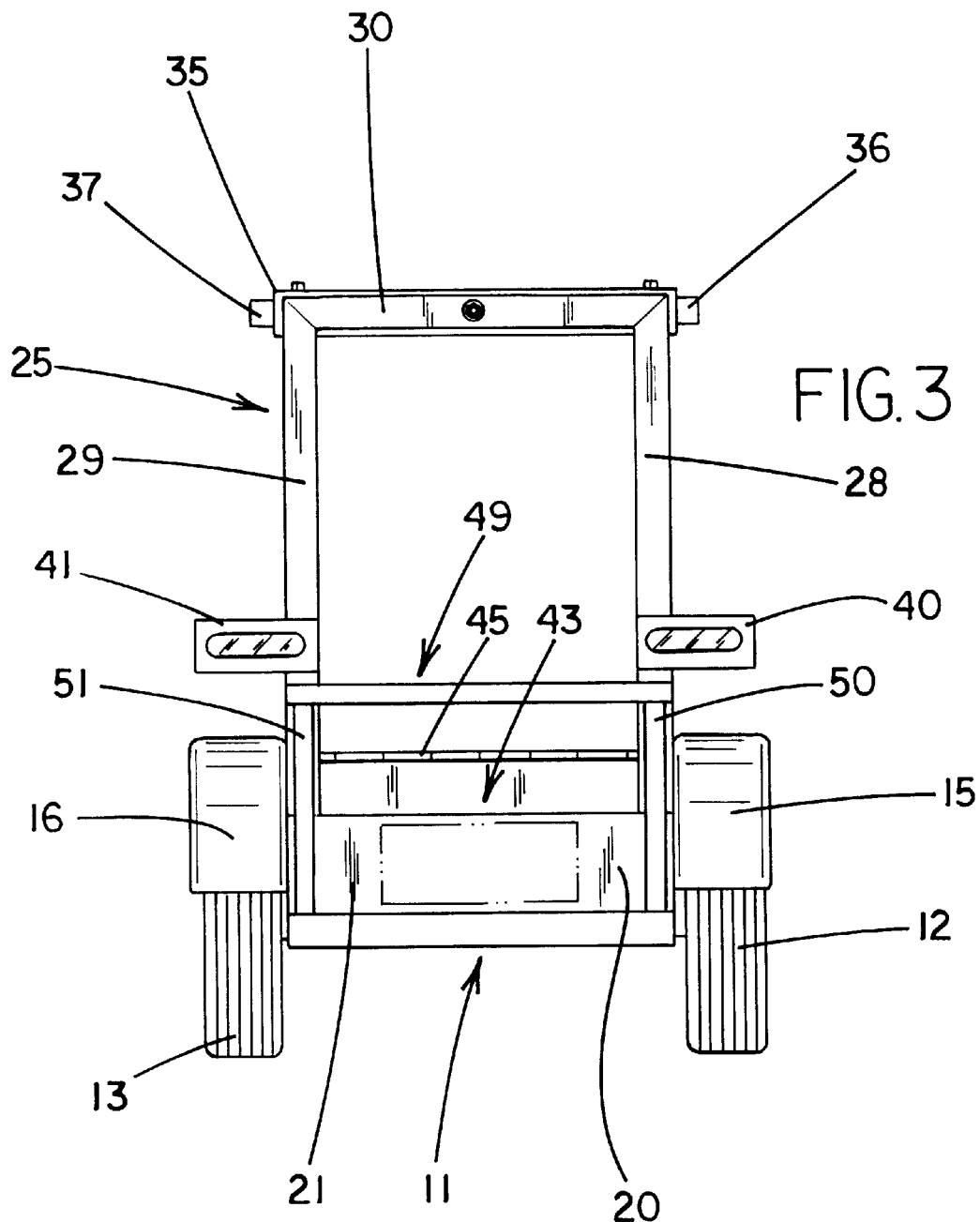
FIG. 3 is a schematic rear view of the present invention.

With reference now to the drawings, and in particular to FIGS. 1 through 3 thereof, a new golf equipment trailer embodying the principles and concepts of the present invention and generally designated by the reference numeral 10 will be described.

As best illustrated in FIGS. 1 through 3, the golf equipment trailer 10 generally comprises a carriage having a pair of ground engaging wheels and a forwardly extending elongate trailer tongue adapted for coupling to a trailer hitch. A pair of bag seats are mounted on the carriage between the wheels of the carriage. Each of the bag seats is adapted for resting a bottom of a golf bag thereon. A bag support frame is upwardly extended from the carriage. The bag support frame includes a back frame and a pair of side frames forwardly located from the back frame. The bag seats are positioned between the side frames and in front of the back frame.

In closer detail, the trailer is designed for coupling to a motorcycle having a trailer hitch so that the trailer may be towed by the motorcycle. Specifically, the trailer 10 includes a carriage 11 having a pair of ground engaging wheels 12,13 and a forwardly extending elongate trailer tongue 14 adapted for coupling to a trailer hitch. In one embodiment, each of the wheels of the carriage may have a fender 15,16 positioned thereabove and mounted to the carriage adjacent the respective wheel.

A pair of bag seats 17,18 are mounted on the carriage between the wheels of the carriage. Each of the bag seats is designed for resting a bottom of a golf bag 19 thereon. The bag seats may each have an upwardly extending lip 20,21 therearound. The lips of the bag seats are designed for helping maintain the bottom of a golf bag on the respective bag seat.

In one embodiment, each of the bag seats may have a generally D-shaped outer perimeter including a substantially straight back edge 22 and an arcuate front edge 23 facing towards the trailer tongue. In this embodiment, the back edges of the bag seats may also be substantially collinear with one another.

A bag support frame 24 is upwardly extended from the carriage. The bag support frame includes a generally inverted U-shaped back frame 25 and a pair of generally inverted L-shaped side frames 26,27 forwardly located from the back frame. The bag seats are positioned between the side frames and in front of the back frame.

The back frame has a spaced apart pair of elongate side bars 28,29 and an upper cross bar 30 extending between upper ends of the side bars to connect the side bars together. The side bars may be extended substantially parallel to each other and substantially perpendicular to the upper cross bar.

One of the side bars may be positioned adjacent one of the wheels of the carriage and the other of the side bars may be positioned adjacent the other of the wheels of the carriage. In one embodiment, each of the side bars may be positioned adjacent the back edge of an adjacent associated bag seat. In such an embodiment, the perimeter lips of the bag seats each may also have an extent 31 extending between the respective bag seat and the associated side bar to connect the bag seats with the side bars.

The side frames each have upper and lower elongate portions 32,33 which may extend substantially perpendicular to one another. Each of the side frames is be positioned adjacent an associated side bar of the back frame. The upper portions of the side frames are each coupled to the associated side bar at positions located towards the upper cross bar. The lower portions of the side frames are each spaced apart from and may also be extended substantially parallel to the associated side bar.

In use, the back frame may provide lateral and rear support to upper portions of the golf bags resting on the bag seats to help prevent the golf bags from falling off of the golf seats. In one embodiment, a securing harness 34 may be coupled to the upper cross bar of the back frame. The securing harness is designed for securing upper portions of the golf bags resting on the bag seats to the bag support frame to help hold the golf bags in position on the bag seats.

One embodiment of the securing harness includes a rear frame 35 having a spaced apart pair of forwardly extending side arms 36,37, and a pair of flexible straps 38,39 each having a pair of opposite ends. One end of each strap is coupled to a middle region of the rear frame, the other end of one of the straps is coupled to one of the side arms and the other end of the other of the straps is coupled to the other of the side arms. The straps each form a bag loop positioned above an associated bag seat and designed for extending around the upper portion of the golf bag resting on the associated bag seat.

The carriage may have a pair of rearwardly facing signal lights 40,41 which may be mounted to the back frame. One of the signal lights may be mounted to one of the side bars of the back frame and the other of the signal lights may be mounted to the other of the side bars of the back frame. Each of the signal lights may include light sources for indicating braking and turning. In use, the signal lights are designed for electrical connection to the turning and brake light system of the motorcycle towing the trailer via an elongate electrical conduit 42 having a forwards end positioned adjacent a front socket portion of the trailer tongue and designed for electrical connection to the turning and brake light system of the motorcycle.

In one embodiment, a storage box 43 may be mounted to the carriage and positioned in front of the bag seats. In use, the storage box is designed for storing items therein including other golf equipment such as shoes and clothing.

The storage box may have a generally rectangular configuration, and a top lid 44 covering an upper opening into the storage box. The top lid may be pivotally coupled by a hinge 45 to a rear portion of the storage box.

The storage box may also have a latch 46 mounted to front portions of the storage box and top lid to permit securing of a padlock thereto to prevent unauthorized access into the storage box.

The storage box may have a pair of end walls 47,48. In one embodiment, one of the end walls of the storage box substantially lies in common vertical plane with one of the side frames of the bag support frame and the other of the end walls of the storage box substantially lies in common vertical plane with the other of the side frames of the bag support frame. In an illustrative embodiment, the storage box has a width defined between the end walls of about 24 inches.

A rearwardly extending platform 49 may be coupled to the side bars of the back frame of the bag support frame. In use, the platform is designed for providing a seat for a user to sit on, which may be useful when the user is putting on or removing their golf shoes. In one embodiment, the platform may lie in a plane extending substantially perpendicular to a plane in which the back frame lies. In such an embodiment, the plane of the platform may also be positioned above the bag seats.

The platform may have has a pair of downwardly extended struts 50,51 coupled to the back frame to provide additional structural support to the platform. In such an embodiment, one of the struts is coupled to one of the side bars of the back frame and the other of the struts is coupled to the other of the side bars of the back frame.

The platform may comprise an expanded metal material for reducing its weight without sacrificing structural strength. The platform may also have a width defined in a rearwards direction away from the plane of the back frame of about 10 inches for providing sufficient width for a user to comfortably sit on the platform.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer, said trailer comprising:
   a carriage having a pair of ground engaging wheels and a forwardly extending elongate trailer tongue adapted for coupling to a trailer hitch;
   a pair of bag seats being mounted on said carriage between said wheels of said carriage;
   each of said bag seats being adapted for resting a bottom of a golf bag thereon;
   a bag support frame being upwardly extended from said carriage;
   said bag support frame comprising a back frame and a pair of side frames forwardly located from said back frame; and
   said bag seats being positioned between said side frames and in front of said back frame.

2. The trailer of claim 1, wherein each of said wheels of said carriage has a fender positioned thereabove and mounted to said carriage adjacent the respective wheel.

3. The trailer of claim 1, wherein said bag seats each have an upwardly extending lip therearound.

4. The trailer of claim 3, wherein each of said bag seats has a generally D-shaped outer perimeter including a substantially straight back edge and an arcuate front edge facing towards said trailer tongue.

5. The trailer of claim 4, wherein said back edges of said bag seats are substantially collinear with one another.

6. The trailer of claim 1, wherein said back frame has a spaced apart pair of elongate side bars and an upper cross bar extending between said side bars to connect said side bars together, wherein said side frames each have upper and lower elongate portions, wherein said upper portions of said side frames are each coupled to an associated side bar of said back frame at positions located towards said upper cross bar.

7. The trailer of claim 6, wherein one of said side bars is positioned adjacent one of said wheels of said carriage and the other of said side bars is positioned adjacent the other of said wheels of said carriage.

8. The trailer of claim 1, further comprising a securing harness being coupled to said back frame, said securing harness being adapted for securing upper portions of the golf bags resting on the bag seats to the bag support frame.

9. The trailer of claim 8, wherein said securing harness comprises a rear frame having a spaced apart pair of forwardly extending side arms, and a pair of flexible straps each having a pair of opposite ends, one end of each strap being coupled to a middle region of said rear frame, the other end of one of said straps being coupled to one of said side arms and the other end of the other of said straps being coupled to the other of said side arms, said straps each forming a bag loop positioned above an associated bag seat.

10. The trailer of claim 1, wherein a storage box is mounted to said carriage and positioned in front of said bag seats.

11. The trailer of claim 10, wherein said storage box has a top lid covering an upper opening into said storage box.

12. The trailer of claim 11, wherein said top lid is pivotally coupled to a rear portion of said storage box.

13. The trailer of claim 12, wherein said storage box has a latch mounted to front portions of said storage box and top lid to permit securing of a padlock thereto to prevent unauthorized access into said storage box.

14. The trailer of claim 1, further comprising a rearwardly extending platform being coupled to said back frame of said bag support frame.

15. The trailer of claim 14, wherein said platform lies in a plane positioned above said bag seats.

16. The trailer of claim 15, wherein said plane of said platform is extended substantially perpendicular to a plane in which said back frame lies.

17. The trailer of claim 16, wherein said platform having a pair of downwardly extended struts coupled to said back frame.

18. A trailer for coupling to a motorcycle having a trailer hitch, said trailer comprising:

a carriage having a pair of ground engaging wheels and a forwardly extending elongate trailer tongue adapted for coupling to a trailer hitch;

each of said wheels of said carriage having a fender positioned thereabove and mounted to said carriage adjacent the respective wheel;

a pair of bag seats being mounted on said carriage between said wheels of said carriage;

each of said bag seats being adapted for resting a bottom of a golf bag thereon;

said bag seats each having an upwardly extending lip therearound, said lips of said bag seats being adapted for helping maintain the bottom of a golf bag on the respective bag seat;

each of said bag seats having a generally D-shaped outer perimeter including a substantially straight back edge and an arcuate front edge facing towards said trailer tongue;

said back edges of said bag seats being substantially collinear with one another;

a bag support frame being upwardly extended from said carriage;

said bag support frame comprising a generally inverted U-shaped back frame and a pair of generally inverted L-shaped side frames forwardly located from said back frame;

said bag seats being positioned between said side frames and in front of said back frame;

said back frame having a spaced apart pair of elongate side bars and an upper cross bar extending between upper ends of said side bars to connect said side bars together;

one of said side bars being positioned adjacent one of said wheels of said carriage and the other of said side bars being positioned adjacent the other of said wheels of said carriage;

said side frames each having upper and lower elongate portions;

each of said side frames being positioned adjacent an associated side bar of said back frame;

said upper portions of said side frames each being coupled to the associated side bar towards said upper cross bar;

a securing harness being coupled to said upper cross bar of said back frame;

said securing harness being adapted for securing upper portions of the golf bags resting on the bag seats to the bag support frame;

said securing harness comprising a rear frame having a spaced apart pair of forwardly extending side arms, and a pair of flexible straps each having a pair of opposite ends;

one end of each strap being coupled to a middle region of said rear frame, the other end of one of said straps being coupled to one of said side arms and the other end of the other of said straps being coupled to the other of said side arms;

said straps each forming a bag loop positioned above an associated bag seat;

a pair of rearwardly facing signal lights being mounted to said back frame, one of said signal lights being mounted to one of said side bars of said back frame and the other of said signal lights being mounted to the other of said side bars of said back frame;

a storage box being mounted to said carriage and positioned in front of said bag seats;

said storage box having a generally rectangular configuration, and a top lid covering an upper opening into said storage box;

said top lid being pivotally coupled to a rear portion of said storage box;

said storage box having a latch mounted to front portions of said storage box and top lid to permit securing of a padlock thereto to prevent unauthorized access into said storage box;

a rearwardly extending platform being coupled to said side bars of said back frame of said bag support frame;

said platform lying in a plane extending substantially perpendicular to a plane in which said back frame lies;

said plane of said platform being positioned above said bag seats; and said platform having a pair of downwardly extended struts coupled to said back frame, one of said struts being coupled to one of said side bars of said back frame and the other of said struts being coupled to the other of said side bars of said back frame.

* * * * *